J. W. REYNOLDS.
FISH BAIT OR LURE.
APPLICATION FILED MAR. 1, 1917.

1,233,507.
Patented July 17, 1917.

James W. Reynolds,
INVENTOR

By George J. Oltsch
ATTORNEY.

UNITED STATES PATENT OFFICE.

JAMES W. REYNOLDS, OF CHICAGO, ILLINOIS.

FISH BAIT OR LURE.

1,233,507. Specification of Letters Patent. Patented July 17, 1917.

Application filed March 1, 1917. Serial No. 151,727.

*To all whom it may concern:*

Be it known that I, JAMES W. REYNOLDS, a citizen of the United States, residing at Chicago, in the county of Cook and State of Illinois, have invented certain new and useful Improvements in Fish Baits or Lures, of which the following is a specification.

The invention relates to an artificial bait or lure for fishing, preferably made of a buoyant material so as to float when not in action, but which will tend to dive beneath the surface and also have a wabbling motion when drawn more or less swiftly through the water.

The primary object of the invention resides in the provision of a fish bait or lure provided with adjustable means adapted to influence the movement of the bait as same is drawn through the water, by which means the depth of travel of the bait may be varied at a given speed of travel, or it may be caused to skip along the surface of the water. Said means is also provided with a formation adapted to impart a wabbling or erratic movement to the bait.

A further object of the invention resides in the provision of a hook mounting which serves as a balance for the bait, and which can be readily shifted to either side of the bait body or to different locations with relation to the body, the mounting being capable of easy and quick adjustment from one position to another without the use of a tool.

Further objects will hereinafter more fully appear from the detailed description of the bait.

The invention in the preferred form of details will be described in the following specification, reference being had particularly to the accompanying drawings, in which.

Figure 1:
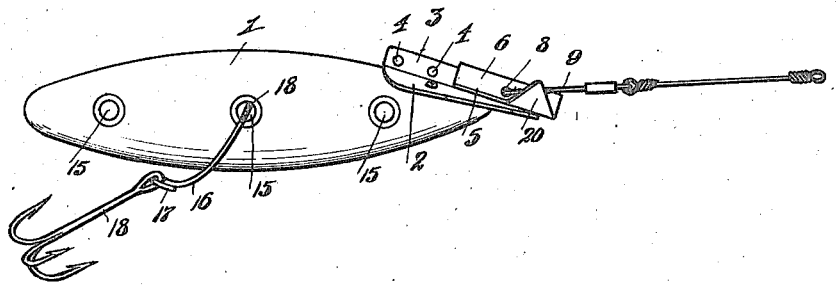
Figure 1 is a side elevation of the improved bait or lure, showing one form of adjustment.
Figure 2:
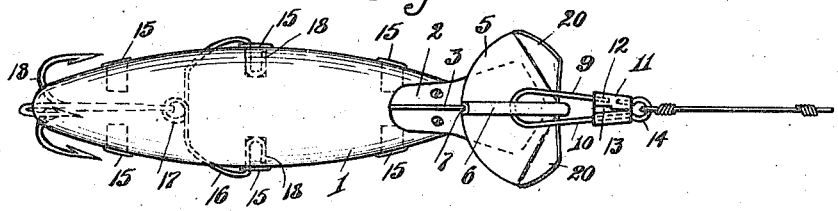
Fig. 2 is a top or plan view of the form shown in Fig. 1.

The body 1 of the bait is formed so as to somewhat resemble the form of a minnow or small fish, and preferably of a material having sufficient buoyancy so as to float when inactive or slowly drawn through the water. Fixedly secured to the forward or head end of the body in any suitable manner, and to approximately one side of the longitudinal center of the body, is what I term a bearing plate 2, provided with an upstanding rib 3, having a plurality of spaced apertures 4 for a purpose which will be presently explained.

Mounted upon the bearing plate 2 and adapted for adjustment longitudinally thereof, is a deflecting fin 5 preferably of sheet metal, and formed to provide a centrally disposed ridge 6 of substantially inverted U- form in cross section. The channel portion 7 of the ridge is adapted to receive the rib 3 of the bearing plate 2. The function of said rib and channeled ridge is to hold the deflecting fin against lateral movement with relation to the bearing plate, and at the same time permit the deflecting fin to be shifted longitudinally of the bearing plate. The bearing plate and the deflecting fin are disposed on a line diagonal to the horizontal plane of the body, and combined form a deflecting means having a greater or less area according to the relative position of said members, whereby the bait may be caused to travel at a greater or less depth beneath the surface at a given rate of speed with which same is drawn through the water. The relative adjustment of said members also governs the degree of wabble or erratic movement of the bait, for the greater the distance of said members to the side of the longitudinal axis of the body the less the stability of balance between the parts forming the bait as a whole will be maintained. Such variance of stability of balance is also affected by the point of attachment of the line to the bait, the ridge 6 being provided with a transverse opening 8 adapted to register with either of the apertures 4 of the bearing plate in the adjustment of the deflecting fin with relation to said plate, a snap hook 9 attached to the end of the fish-line being passed through the openings to lock said parts together. It will be obvious from the foregoing that the farther up on the body of the bait the fin is positioned, the farther away from the longitudinal axis of the body the line attachment will be, thus diminishing the stability of balance accordingly and cause the bait to have an unsteady or wabbling movement as same is drawn through the water. The snap hook 9 is of the well known form employing a spring wire loop 10 attached to a keeper 11, the free end 12 of the loop being sprung to pass through an opening 13 in the keeper for locking relation therewith, and an eye 14 formed at one end to receive the line for attachment thereto. While said form of snap hook is particularly adapted for the purpose used, any other suitable means for locking said parts together may be employed which will facilitate the quick attachment and detachment thereof in adjusting the deflecting fin. Obviously the line may be attached direct to the bait without the intervention of the snap hook.

Figure 3:
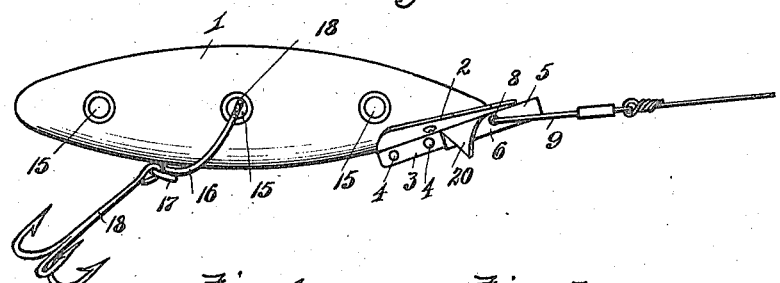
Fig. 3 is a side elevation showing another form of adjustment.

The bait body is provided with a series of oppositely disposed sockets 15, adapted to receive the ends of a tensioned wire hook mounting 16, which is of substantially U-form to fit around the bait body, and looped intermediate its ends, as at 17, to form an eye to which the fish-hook 18 is attached. The ends of the mounting are bent inwardly in the direction of each other and outwardly at their free ends 18, such free ends being brought under tension when forced to place within the sockets in order to form a firm contact and prevent the mounting as a whole from swinging. The hook and its mounting serve as a balance for the bait, and as the mounting may be easily sprung for detachment from the body the same may be quickly removed and snapped to place in connection with either pair of the series of sockets 15, which are spaced longitudinally of the body, so that the hook may be mounted forwardly, centrally, or rearwardly of the body, as may be desired. The balance of the body may also be reversed by shifting the mounting and its hook to the opposite side of body, as shown in Fig. 3.

Figure 4:
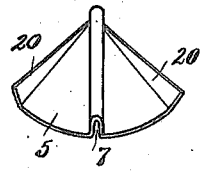
Fig. 4 is a perspective view of a modified form of deflecting plate or fin.
Figure 5:
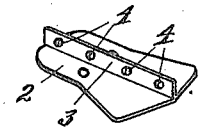
Fig. 5 is a perspective view of a plate to be fixed to the head end of the bait body.

It will be noted that the deflecting fin 5, as well as the modified form thereof shown in Fig. 4, are provided with wings 20 disposed at an angle with relation to the body of said members. Said wings are adapted to offer resistance to the water at a different angle from that of the greater deflecting surface of said members, so that the angularity thereof will tend to impart a wabbling or erratic movement to the bait, as well as to create a splash and agitation of the water when the fins are reversed, as shown, for instance, in Fig. 4. Said wings thus amplify the erratic or wabbling movement which, in a degree, is obtained without the use thereof, as in the manner hereinbefore explained.

If desired, the deflecting fin 5 may be detached and the line attached direct to either of the spaced holes 4 in the rib 3 of the plate 2, the latter thus serving as a deflecting fin. If the line is attached to the forward hole the bait will travel near the surface of the water with a slight wiggle. The farther the line is attached remote from the forward end of the plate the more the bait body and plate will be permitted to tilt at an angle with relation to the line of draft, and hence the greater depth of travel. Also the higher up on the bait the line is attached, the greater the tendency of the bait to wabble. By changing the hook mounting to the opposite side of the bait body the balance of the body will be reversed, and the plate 2 will angle forwardly and upwardly, as shown in Fig. 3, thus causing the bait to travel on the surface. What has been said with relation to the action of the bait without the use of the deflecting fin 5, is also true when said fin is used, except that its use, due to its larger resisting surface, amplifies the movements and actions above explained. The variety of movements obtainable by adjusting the various parts of the bait are so numerous that practically every desire of the angler with respect to the action of the bait is obtainable. The main and essential movements desired have been herein pointed out.

What is claimed is:

1. A fish bait comprising a body having line attaching means, and a deflecting member having a line receiving means adapted to register with said line attaching means, whereby the deflecting member will be locked to the line attaching means by the application of the line through both of said means.

2. A fish bait comprising a body provided with an angularly disposed deflecting member at its forward end, and a body balancing hook suspension adjustable with respect to opposite sides of the body, whereby the balance of the body may be changed to vary the direction of movement of the same under the influence of the deflecting member.

3. A fish bait comprising a body, a plate secured to and diagonally of the body, a deflecting fin mounted on said plate for longitudinal adjustment with relation thereto to vary the combined length and deflecting surface of the plate and fin, and means for locking the deflecting fin to the plate.

4. A fish bait comprising a body, a plate secured to and diagonally of the body, a demountable deflecting fin having angling wings mounted on said plate for adjustment longitudinally of the bait and for reversal end for end whereby the wings of the fin may be presented at reverse angles for deflecting purposes, and means for locking the fin to the plate in its adjustable relations.

5. A fish bait comprising a body, a plate secured to and diagonally of the body provided with a longitudinally disposed rib having a series of spaced holes, a deflecting fin provided with a guide portion adapted to straddle said rib and shiftable thereon, said guide portion having opposed holes adapted to register with either of the holes of the rib, and means insertible through the registering holes to lock the deflecting fin to the plate.

6. In a fish bait, the combination with a body having oppositely disposed sockets, of a spring wire hook suspending member of substantially U-form adapted to have its free ends brought under tension when spread and seated in said sockets.

7. In a fish bait, the combination with a body having oppositely disposed sockets, of a spring wire hook suspending member of substantially U-form adapted to have its free ends tensioned when spread and seated in the sockets, said free ends being bent upon themselves in spaced relation to provide yielding heads, whereby the opposite portions of said heads will relatively yield and bind under tension against the walls of the sockets when forced to place.

In testimony whereof I affix my signature.

JAMES W. REYNOLDS.